US012085230B2

(12) United States Patent
Ku et al.

(10) Patent No.: US 12,085,230 B2
(45) Date of Patent: Sep. 10, 2024

(54) VACUUM SUPPLY GAS CYLINDER

(71) Applicants: Feng Yuan Ku, Hsinchu (TW); Min-Kuang Chang, Miaoli (TW)

(72) Inventors: Feng Yuan Ku, Hsinchu (TW); Min-Kuang Chang, Miaoli (TW)

( * ) Notice: Subject to any disclaimer, the term of this patent is extended or adjusted under 35 U.S.C. 154(b) by 289 days.

(21) Appl. No.: 16/945,951

(22) Filed: Aug. 3, 2020

(65) Prior Publication Data

US 2021/0041068 A1 Feb. 11, 2021

(30) Foreign Application Priority Data

Aug. 5, 2019 (TW) ................................ 10812766.5

(51) Int. Cl.
*F17C 13/04* (2006.01)

(52) U.S. Cl.
CPC ...... *F17C 13/04* (2013.01); *F17C 2201/0119* (2013.01); *F17C 2205/0335* (2013.01); *F17C 2205/0338* (2013.01); *F17C 2205/0341* (2013.01); *F17C 2205/0352* (2013.01); *F17C 2221/015* (2013.01); *F17C 2270/0518* (2013.01)

(58) Field of Classification Search
CPC .............. F17C 13/04; F17C 2201/0119; F17C 2205/0335; F17C 2205/0341; F17C 2205/0352; F17C 2221/015; F17C 2270/0518
USPC ............................................................... 222/3
See application file for complete search history.

(56) References Cited

U.S. PATENT DOCUMENTS 6,911,065 B2 * 6/2005 Watanabe ................. F17C 5/00 96/138
2008/0283123 A1 11/2008 Stenmark

FOREIGN PATENT DOCUMENTS

CN 108027106 A 5/2018
TW 1250258 B 3/2006
WO WO-2014047522 A1 * 3/2014 .............. F17C 13/04

OTHER PUBLICATIONS

"Check Valve" Definition from Science Direct.com, as retrieved from https://www.sciencedirect.com/topics/engineering/check-valve#:~:text=Check%20valves%20are%20one%2Dway,flow%20in%20only%20one%20direction. (Year: 2022).*

* cited by examiner

*Primary Examiner* — Timothy L Maust
*Assistant Examiner* — Christopher M Afful

(57) ABSTRACT

A vacuum supply gas cylinder includes a cylinder body, a cylinder valve, a pipeline structure, a first check valve, a positive pressure regulating valve and a second check valve. The cylinder body includes an accommodating space and an opening. The cylinder valve closes the opening. The pipeline structure includes a first and second pipeline. The first check valve is one-way and disposed at the first pipeline. The first check valve has an opening pressure for a gas flow direction from the second end to the first end. The positive pressure regulating valve is disposed at the first pipeline and has an output pressure having a direction same as the gas flow direction from the second end to the first end. The second check valve is one-way and disposed at the first pipeline and is in the same direction as the flow direction of the input and stored gas.

8 Claims, 2 Drawing Sheets

VACUUM SUPPLY GAS CYLINDER

FIELD OF THE INVENTION

The invention relates to a vacuum supply gas cylinder, and more particularly to a vacuum supply gas cylinder which can only release gas under a negative pressure or vacuum environment.

BACKGROUND OF THE INVENTION

Ion implantation and diffusion implantation are two common procedures in the semiconductor doping process. Compared with the diffusion implantation procedure, the ion implantation procedure has the advantages of being able to operate at low temperature and vacuum, the concentration of impurity doping can be precisely controlled, good impurity uniformity, the ability to penetrate the film, and no solid solubility limit.

The ion implantation procedure is to implant a plasma ion beam into a semiconductor, and the ions in the ion beam are dissociated from the gas containing this ion, wherein the gas is usually stored in a high-pressure cylinder. Therefore, ion implanters are usually connected to multiple high-pressure cylinders. Each high-pressure cylinder is filled with gas. The gas in the high-pressure cylinder is sucked out by the vacuum equipment of the ion implanter, and then dissociated and plasmatized to form ion beam. The entire process is operated under vacuum negative pressure environment.

In order to cooperate with the vacuum environment of the ion implantation equipment and avoid gas leakage from the high-pressure cylinder, a precision valve is usually designed to close the high-pressure cylinder. However, the more precise valves also increase the installation cost of high-pressure cylinders; or, after the valve is connected to the ion implanter, it requires multiple operations to lead the gas out of the high-pressure cylinder.

Most of the gas cylinders used in ion implantation equipment is high-pressure gas cylinders in the early days. However, for safety reasons, most of the gas cylinders used in ion implantation equipment have been changed to vacuum supply gas cylinders (VSGs).

At present, there are two types of vacuum cylinders. One is a gas cylinder that uses an adsorbent to adsorb gas, and the other is a vacuum regulating valve that adjusts the gas pressure in the cylinder below the negative pressure to supply gas. This vacuum cylinder usually has two valve ports, one is the input port and the other is the output port, so it has a more complicated valve design.

SUMMARY OF THE INVENTION

The invention provides a vacuum supply gas cylinder, which uses a positive pressure regulating valve and a check valve to form a negative pressure gas supply effect. Therefore, only one valve port is necessary for gas input and output. As such, it has a simple structure, can reduce the cost, is convenient to operate, has improved safety, and reduce the operation complexity required to extract the gas.

The vacuum supply gas cylinder provided by the invention is used to supply gas under a negative pressure or vacuum environment. The vacuum supply gas cylinder includes a cylinder body, a cylinder valve, a pipeline structure, a first check valve, a positive pressure regulating valve and a second check valve. The cylinder body includes an accommodating space for storing the gas and an opening located at one end of the accommodating space. The cylinder valve is for closing the opening of the cylinder body and includes an output/input port and a channel. The two ends of the channel respectively communicate with the output/input port and the accommodating space of the cylinder body. The pipeline structure includes a first pipeline and a second pipeline. The first pipeline includes a first end connected to the channel and a second end extending into the accommodating space. The second pipeline is connected to the first pipeline. The gas stored in the accommodating space flows toward the first end through the second end of the first pipeline when the gas is released from the accommodating space. The gas flows toward the second pipeline via the first end of the first pipeline when the gas is supplied to and stored in the vacuum supply gas cylinder. The first check valve is a one-way valve and disposed at the first pipeline, a connection of the second pipeline and the first pipeline is located between the first end and the first check valve, and the first check valve has an opening pressure for a gas flow direction from the second end to the first end. The positive pressure regulating valve is disposed at the first pipeline and closer to the second end of the first pipeline than the first check valve. The positive pressure regulating valve has an output pressure. The output pressure has a direction same as the gas flow direction from the second end to the first end, can adjust the gas in the accommodating space from high pressure to low pressure, and is set at a predetermined value. The second check valve is a one-way valve and disposed at the first pipeline, and the second check valve is in the same direction as the flow direction of the gas input and stored in the second pipeline.

In an embodiment of the invention, the opening pressure of the first check valve is greater than the output pressure of the positive pressure regulating valve.

In an embodiment of the present invention, the output pressure of the positive pressure regulating valve is expressed as P1, and the opening pressure of the first check valve is expressed as P2. When $P1<P2$, the gas is stored in the accommodating space, and when the gas is to be led out of the accommodating space, the output/input port can be connected to a negative pressure vacuum device to provide a vacuum degree. A negative pressure of the vacuum degree relative to the accommodating space is expressed as P3, and when $P1+P3>P2$, the gas can be released from the accommodating space.

In an embodiment of the invention, $0\ \text{psi}<P1+P3-P2<14.7\ \text{psi}$ (an environment of one atmospheric pressure).

In an embodiment of the present invention, the vacuum supply gas cylinder further includes a first filter disposed at the second end of the first pipeline.

In an embodiment of the present invention, the vacuum supply gas cylinder further includes a second filter disposed between the first check valve and a connection of the second pipeline and the first pipeline.

In an embodiment of the present invention, the gas includes specific gases such as arsine ($AsH_3$), phosphine ($PH_3$), boron trifluoride ($BF_3$), silicon tetrafluoride ($SiF_4$)), carbon monoxide (CO) or germanium tetrafluoride ($GeF_4$), or a mixture thereof.

In an embodiment of the invention, the second check valve is disposed at an end of the second pipeline.

In an embodiment of the present invention, the cylinder valve includes a valve body and a stopper connected to each other. The output/input port is disposed at the valve body. The stopper is used to close the opening of the cylinder body. The channel extends from the stopper to the output/input port.

In the vacuum supply gas cylinder of the embodiment of the present invention, the first check valve, the second check valve and the pressure regulating valve for regulating, storing and releasing gas are provided in the cylinder body with the pipeline structure, so that the cylinder valve only need one output/input port. As such, the structural complexity of the cylinder valve can be greatly reduced, and the convenience and safety of operation can be provided, thereby reducing costs. In addition, no gas flows out when the cylinder valve is opened under a generally open atmosphere, and therefore the operation is quite safe. In addition, the gas can be immediately stored in or drawn out as long as the output/input port is connected to the gas source or negative pressure vacuum device and when the preset pressure conditions are reached, and therefore the operation is very convenient.

In order to make the above and other objects, features and advantages of the present invention become more apparent and obvious, the embodiments will be described in detail with reference to the accompanying drawings hereinafter.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF EMBODIMENTS

The present invention will now be described more specifically with reference to the following embodiments. It is to be noted that the following descriptions of embodiments of this invention are presented herein for purpose of illustration and description only. It is not intended to be exhaustive or to be limited to the precise form disclosed.

Figure 1:
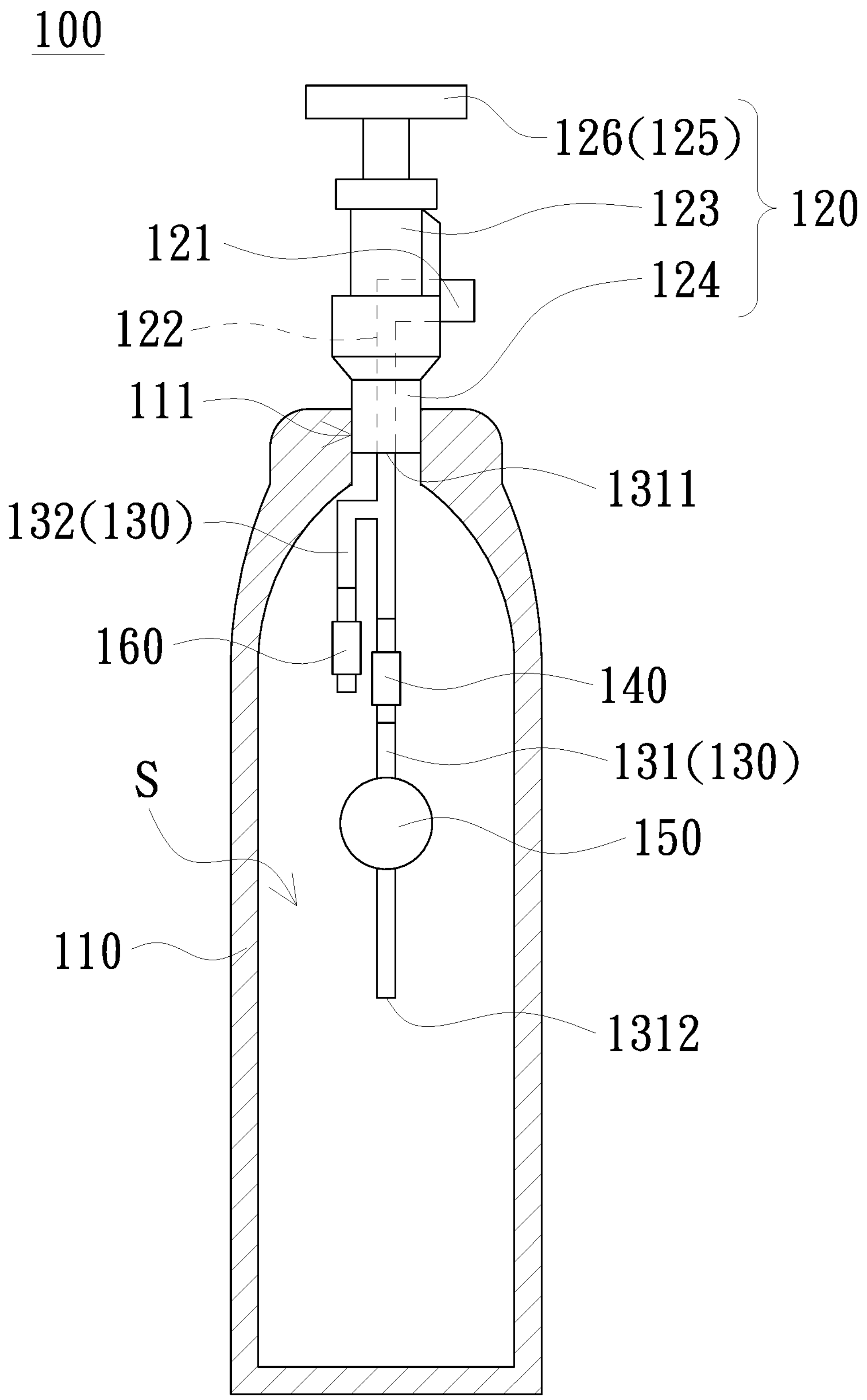
FIG. 1 is a schematic perspective view of a vacuum supply gas cylinder according to an embodiment of the invention.

FIG. 1 is a schematic perspective view of a vacuum supply gas cylinder according to an embodiment of the invention. Referring FIG. 1, the vacuum supply gas cylinder 100 of this embodiment is capable of supplying gas under a negative pressure or vacuum environment and includes a cylinder body 110, a cylinder valve 120, a pipeline structure 130, a first check valve 140, a positive pressure regulating valve 150 and a second check valve 160.

The cylinder body 110 has an accommodating space S for safe storage and safe transportation of gas and has an opening 111 at one end of the accommodating space S. The cylinder valve 120 is used to close the opening 111 of the cylinder body 110 and has an output/input port 121 and a channel 122. The two end of the channel 122 respectively communicate with the output/input port 121 and the accommodating space S of the cylinder body 110. The cylinder valve 120 may further include a flow limiting structure (not shown) to adjust the caliber of the output/input port 121 to adjust the flow rate of the gas output/input of the vacuum supply gas cylinder 100.

The pipeline structure 130 includes a first pipeline 131 and a second pipeline 132. The first pipeline 131 has a first end 1311 connected to the channel 122 and a second end 1312 extending into the accommodating space S. The second pipeline 132 is connected to the first pipeline 131. The gas stored in the accommodating space S flows via the second end 1312 of the first pipeline 131 toward the first end 1311 when the gas is released from the accommodating space S. Alternatively, the gas flows toward the second pipeline 132 via the first end 1311 of the first pipeline 131 when the gas is filling into the vacuum supply gas cylinder 100.

The first check valve 140 and the second check valve 160 are one-way valves, that is, only one-way flow direction is allowed. However, for the allowed gas flow direction, it is still necessary to sense the preset opening pressure before the gas to flow.

The first check valve 140 is disposed at the first pipeline 131 and the allowed gas flow direction thereof is from the second end 1312 to the first end 1311 (i.e., the flow direction of the output gas). The connection of the second pipeline 132 and the first pipeline 131 is located between the first end 1311 and the first check valve 140. The first check valve 140 has an opening pressure corresponding to the flow direction of the output gas. That is, when the first check valve 140 senses that the gas pressure of the gas flowing from the second end 1312 to the first end 1311 is greater than the opening pressure, the first check valve 140 is opened to allow gas to pass therethrough and therefore gas is released from the accommodating space S.

The pressure regulating valve 150 may be a positive pressure regulating valve and is disposed at the first pipeline 131 and closer to the second end 1312 of the first pipeline 131 than the first check valve 140. The positive pressure regulating valve 150 has an output pressure in the same direction as the flow direction from the second end 1312 to the first end 1311 (i.e., the flow direction of the output gas), so as to reduce the gas pressure of the gas stored in the accommodating space S.

The output pressure of the positive pressure regulating valve 150 is expressed as P1, the opening pressure of the first check valve 140 is expressed as P2, and the relationship between the output pressure P1 of the positive pressure regulating valve 150 and the opening pressure P2 of the first check valve 140 is: $P1<P2$. Since $P1<P2$, the gas still cannot flow out of the vacuum supply gas cylinder 100 when the cylinder valve 120 is opened in an atmospheric environment, and therefore the gas can be safely retained in the vacuum supply gas cylinder 100, and thereby having high safety. To start the gas supply, the output/input port 121 of the cylinder valve 120 can be connected to a negative pressure vacuum device (not shown) so that the channel 122 has a vacuum degree, wherein the negative pressure of this vacuum degree relative to the accommodating space S is expressed as P3. To extract the gas stored in the cylinder body 110, the output pressure P1 of the positive pressure regulating valve 150, the opening pressure P2 of the first check valve 140 and the negative pressure P3 generated by the vacuum degree of the channel 122 must satisfy the relationship: $P1+P3>P2$. In order to efficiently extract the gas stored in the cylinder body 110, the difference between the output pressure P1 of the positive pressure regulating valve 150 plus the negative pressure P3 generated by the vacuum degree of the channel 122 and the opening pressure P2 of the first check valve 140 can satisfy the relationship: $0\text{ psi}<P1+P3-P2<14.7\text{ psi}$ (an environment of one atmospheric pressure), but is not limited thereto. The gas can be extracted from the vacuum supply gas cylinder 100 as long as $P1+P3-P2$ is greater than 0 psi.

The second check valve 160 is disposed at the second pipeline 132 and is a one-way valve in the same direction as the flow direction of the input gas. That is, the gas flow directions allowed by the first check valve 140 and the second check valve 160 are opposite to each other. The second check valve 160 only allows gas to be stored and input into the vacuum supply gas cylinder 100 from the outside. The second check valve 160 may be disposed at the end of the second pipeline 132, and the opening pressure of the second check valve 160 may be substantially the same as the opening pressure P2 of the first check valve 140. Since the second pipeline 132 is not provided with a pressure regulating valve 150, the gas can only flow out from the second end 1312 of the first pipeline 131 but not from the second pipeline 132 even when the output/input port 121 of the cylinder valve 120 is connected to a negative pressure vacuum device and begins to extract gas from the accommodating space S. In addition, the length of the second pipeline 132 can be shorter than that of the first pipeline 131 due to that the second pipeline 132 only needs to be provided with the second check valve 160.

In this embodiment, the gas may include specific gases such as arsine ($AsH_3$), phosphine ($PH_3$), boron trifluoride ($BF_3$), silicon tetrafluoride ($SiF_4$), carbon monoxide (CO), or germanium tetrafluoride ($GeF_4$), or mixed gases including the above specific gases, but the invention is not limited thereto.

In this embodiment, the cylinder valve 120 includes a valve body 123 and a stopper 124 connected to each other. The output/input port 121 is provided at the valve body 123, the stopper 124 is used to close the opening 111 of the cylinder body 110, and the channel 122 extends from the stopper 124 to the output/input port 121. The stopper 124 and the opening 111 of the cylinder body 110 can be coupled together by matching screw structures, but the invention is not limited thereto. The stopper 124 and the opening 111 of the cylinder body 110 may have other different coupling structures.

The cylinder valve 120 of the vacuum supply gas cylinder 100 of this embodiment may further include a valve hand wheel 125. The valve hand wheel 125 includes an operating portion 126 and a blocking portion (not shown). The blocking portion is connected to the operating portion 126 and extends into the cylinder valve 120. The operating portion 126 may be, for example, screwed to the top of the valve body 123, and the blocking portion may be raised and lowered with the rotation of the operating portion 126 to close or open the channel 122. Therefore, with the pipeline structure 130 of this embodiment in combination with the first check valve 140, the pressure regulating valve 150 and the second check valve 160, the gas will not leak from the accommodating space S of the cylinder body 110 but can be safely stored in the accommodating space S before sufficient negative pressure is applied to the channel 122. The setting specifications of the cylinder valve 120 can be similar to the current general valve without the need for an overly complicated and expensive structure.

In the vacuum supply gas cylinder 100 of this embodiment, the first check valve 140, the second check valve 160 and the pressure regulating valve 150 for regulating, storing and releasing gas are provided in the cylinder body 110 with the pipeline structure 130. Therefore, the structural complexity of the cylinder valve 120 can be greatly reduced, thereby reducing costs. In addition, no gas flows out when the vacuum supply gas cylinder 100 of this embodiment opens the cylinder valve 120 under a generally open atmosphere, and therefore the operation is quite safe. In addition, the gas can be immediately stored in or drawn out as long as the output/input port 121 is connected to the gas source or negative pressure vacuum device and when the preset pressure conditions are reached, and therefore the operation is very convenient.

Figure 2:
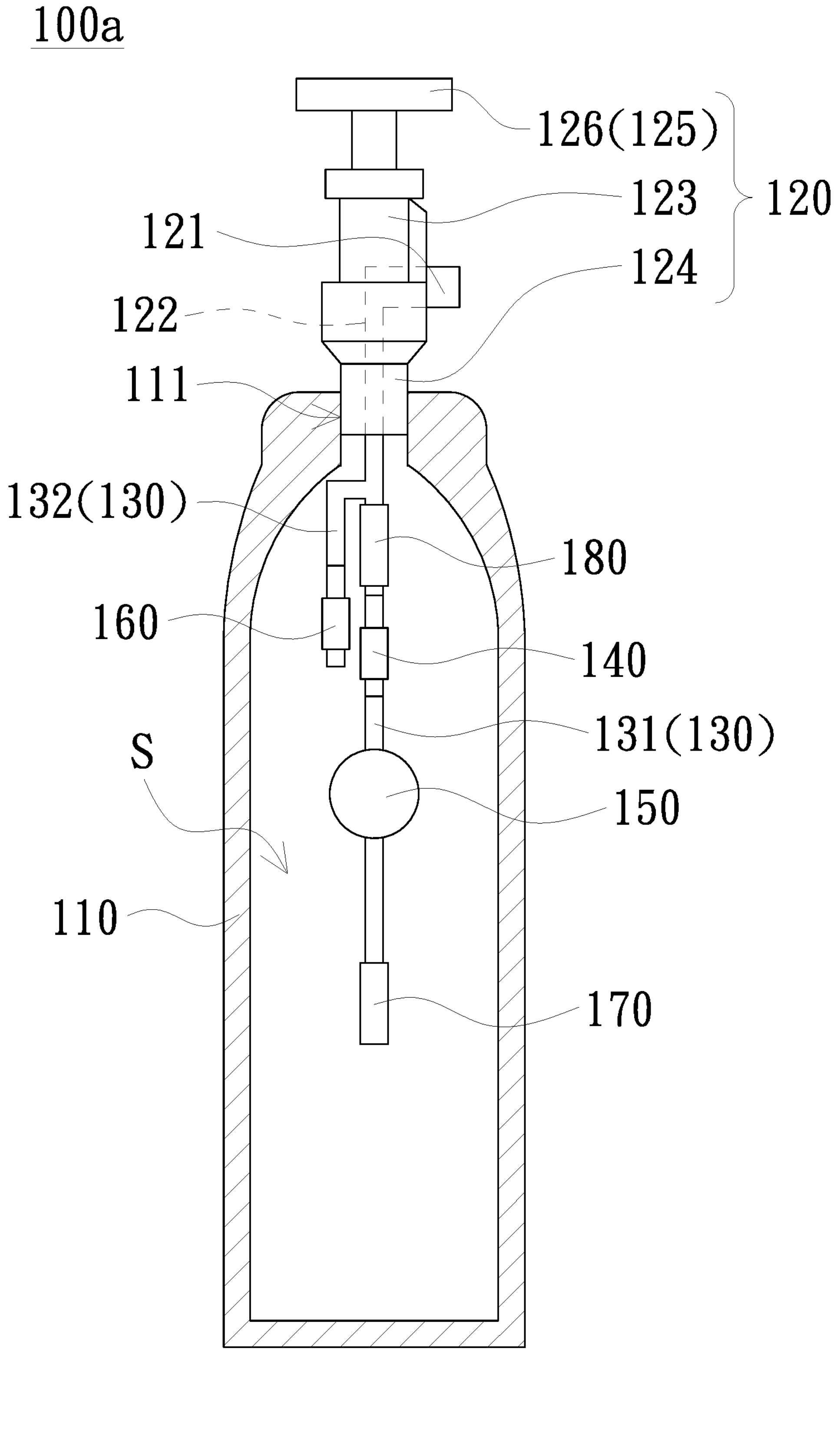
FIG. 2 is a schematic perspective view of a vacuum supply gas cylinder according to another embodiment of the invention.

FIG. 2 is a schematic perspective view of a vacuum supply gas cylinder according to another embodiment of the invention. Referring to FIG. 2, the vacuum supply gas cylinder **100*a* of this embodiment is substantially the same as the vacuum supply gas cylinder 100 of FIG. 1. The main difference is that the vacuum supply gas cylinder 100*a* may further include a first filter 170 disposed at the second end 1312 of the first pipeline 131. In addition, the vacuum supply gas cylinder 100*a* may further include a second filter 180 disposed between the first check valve 140 and the connection of the second pipeline 132 and the first pipeline 131**.

Since the gas stored in the vacuum supply gas cylinder **100*a* is to be dissociated, the vacuum supply gas cylinder 100*a* inevitably contains deposits or impurities formed by the reaction of the gas with the cylinder wall surface. In order to avoid these deposits or impurities from passing through the pipeline structure 130 to enter the ion source (not shown) of the ion implanter (not shown) and therefore causing damage to the equipment of the ion implantation system, the first filter 170 and the second filter 180 can be provided in the first pipeline 131**.

In the vacuum supply gas cylinder of the embodiment of the present invention, the first check valve, the second check valve and the pressure regulating valve for regulating, storing and releasing gas are provided in the cylinder body with the pipeline structure, so that the cylinder valve only need one output/input port. As such, the structural complexity of the cylinder valve can be greatly reduced, and the convenience and safety of operation can be provided, thereby reducing costs. In addition, no gas flows out when the cylinder valve is opened under a generally open atmosphere, and therefore the operation is quite safe. In addition, the gas can be immediately stored in or drawn out as long as the output/input port is connected to the gas source or negative pressure vacuum device and when the preset pressure conditions are reached, and therefore the operation is very convenient.

While the invention has been described in terms of what is presently considered to be the most practical and embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A vacuum supply gas cylinder having a safety design for releasing a gas under a negative pressure environment, consisting of:

a cylinder body, comprising an accommodating space for storing the gas and an opening located at one end of the accommodating space;

a cylinder valve, for closing the opening of the cylinder body and comprising an output/input port and a channel, wherein two ends of the channel respectively communicate with the output/input port and the accommodating space of the cylinder body, and the output/input port is integrated into a valve port adapted to allow the gas to enter to and to release from the cylinder body;

a pipeline structure, comprising a first pipeline and a second pipeline, wherein the first pipeline comprises a first end connected to the channel and a second end extending into the accommodating space, the second pipeline is connected to the first pipeline, the gas stored in the accommodating space flows toward the first end through the second end of the first pipeline when the gas is released from the accommodating space, and the gas flows toward the second pipeline via the first end of the first pipeline when the gas is supplied to and stored in the vacuum supply gas cylinder;

a first check valve, wherein the first check valve is a one-way valve and disposed at the first pipeline, a connection of the second pipeline and the first pipeline is located between the first end and the first check valve, and the first check valve has an opening pressure for a gas flow direction from the second end to the first end;

a positive pressure regulating valve, disposed at the first pipeline and closer to the second end of the first pipeline than the first check valve, wherein the positive pressure regulating valve has an output pressure, the output pressure has a direction same as the gas flow direction from the second end to the first end, can adjust the gas in the accommodating space from high pressure to low pressure, and is set at a predetermined value; and a second check valve, wherein the second check valve is a one-way valve and disposed at the first pipeline, and the second check valve is in the same direction as the flow direction of the gas input and stored in the second pipeline, wherein the output pressure of the positive pressure regulating valve is expressed as P1, and the opening pressure of the first check valve is expressed as P2, wherein when P1<P2, the gas is stored in the accommodating space; and the output/input port is adapted to be connected to a negative pressure vacuum device to provide a vacuum degree for releasing the gas, wherein when a negative pressure of the vacuum degree relative to the accommodating space is expressed as P3, the gas is released from the accommodating space when P1+P3>P2.

2. The vacuum supply gas cylinder according to claim 1, wherein the opening pressure of the first check valve is greater than the output pressure of the positive pressure regulating valve.

3. The vacuum supply gas cylinder according to claim 1, wherein 0 psi<P1+P3-P2 <14.7 psi (an environment of one atmospheric pressure).

4. The vacuum supply gas cylinder according to claim 1, further comprising a first filter disposed at the second end of the first pipeline.

5. The vacuum supply gas cylinder according to claim 4, further comprising a second filter disposed between the first check valve and a connection of the second pipeline and the first pipeline.

6. The vacuum supply gas cylinder according to claim 1, wherein the gas comprises arsine ($AsH_3$), phosphine ($PH_3$), boron trifluoride ($BF_3$), silicon tetrafluoride ($SiF_4$), carbon monoxide (CO) or germanium tetrafluoride ($GeF_4$), or a mixture thereof.

7. The vacuum supply gas cylinder according to claim 1, wherein the second check valve is disposed at an end of the second pipeline.

8. The vacuum supply gas cylinder according to claim 1, wherein the cylinder valve comprises a valve body and a stopper connected to each other, the output/input port is disposed at the valve body, the stopper is used to close the opening of the cylinder body, and the channel extends from the stopper to the output/input port.

* * * * *